United States Patent
Angelilli et al.

(10) Patent No.: US 10,024,657 B2
(45) Date of Patent: Jul. 17, 2018

(54) METHOD FOR CLASSIFYING METAL TUBES

(71) Applicant: Danieli & C. Officine Meccaniche S.P.A., Buttrio (IT)

(72) Inventors: Andrea Angelilli, Pacentro (IT); Luca Crespan, Cervignano del Friuli (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 260 days.

(21) Appl. No.: 14/923,240

(22) Filed: Oct. 26, 2015

(65) Prior Publication Data

US 2016/0123727 A1    May 5, 2016

(30) Foreign Application Priority Data

Oct. 29, 2014    (IT) .............. MI2014A1855

(51) Int. Cl.
| | |
|---|---|
| *G01B 17/02* | (2006.01) |
| *G01B 5/252* | (2006.01) |
| *G01B 7/312* | (2006.01) |
| *G01B 11/06* | (2006.01) |

(52) U.S. Cl.
CPC .............. *G01B 17/02* (2013.01); *G01B 5/252* (2013.01); *G01B 7/312* (2013.01); *G01B 11/0691* (2013.01)

(58) Field of Classification Search
CPC ........ G01B 17/02; G01B 5/252; G01B 7/312; G01B 11/0691
USPC .......................................................... 73/633
See application file for complete search history.

(56) References Cited

U.S. PATENT DOCUMENTS

| | | | | |
|---|---|---|---|---|
| 3,426,437 | A * | 2/1969 | Rebhun ................. | G01B 7/312 29/596 |
| 4,099,418 | A * | 7/1978 | Bennett ................. | G01B 5/252 73/622 |
| 4,196,607 | A | 4/1980 | Youtsey et al. | |
| 2011/0060444 | A1 * | 3/2011 | Becker ................... | B23K 26/38 700/106 |

FOREIGN PATENT DOCUMENTS

EP      1611969      4/2006

* cited by examiner

*Primary Examiner* — Natalie Huls
*Assistant Examiner* — Monica S Young
(74) *Attorney, Agent, or Firm* — Stetina Brunda Garred & Brucker (57) ABSTRACT

A method or classifying metal tubes in which the measuring of the eccentricity over the entire length of the tube is provided, and in which the classification occurs on the basis of the length of the tube portions which have eccentricity either higher or lower than one or more eccentricity thresholds.

9 Claims, 4 Drawing Sheets

METHOD FOR CLASSIFYING METAL TUBES

CROSS REFERENCE TO RELATED APPLICATIONS

The present application claims priority to Italian Patent Application No. MI2014A001855 filed Oct. 29, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a method for classifying metal tubes, for example metal tubes advancing along a processing plant, such as a rolling or drawing plant.

STATE OF THE ART

Production defects of metal tubes are highly frequent. Among the most common defects is the non-homogeneous distribution of the thickness of the tube walls. Considering the cross section of a tube, the wall should nominally be defined by two concentric circumferences, hence the inner and outer radii of the tube should be constant for the entire section. In other words, the thickness of the tube wall should be equal for the entire section. However, the actual sections of the tubes manufactured are typically eccentric, and therefore are not homogeneous. In particular, for the section of certain stretches of tube, it may occur that there are variations of the inner radius and/or outer radius, whereby the wall is thinner in certain areas and thicker others. This defect is particularly frequent for very long tubes. These tubes are then used for various applications, for some of which the size tolerances are broader, while for others there is a need for the thickness of the wall to be as constant as possible for the entire length of the tube. If this cannot be achieved, manufacturers are often requested to supply a minimum wall thickness, whereby more material is typically used during the production than that nominally required, in order to ensure that the thinnest wall of the tube has the thickness required, or that the average thickness complies with such a requirement. Disadvantageously, this expedient involves a great waste of material, with apparent economic repercussions, especially if the raw material is costly, such as for example, copper. There is also a need to have an eccentricity measurement of the tube. Disadvantageously, the eccentricity is typically measured after the tube has been manufactured, with measuring methods which may not be sufficiently reliable. For example, it is manually measured in the head portion and tail portion of the tube. Furthermore, it may be measured in intermediate areas, but such measurements are generally destructive, involving cutting a sample tube which obviously will no longer have the length required for the application desired. In any case, a sufficiently accurate eccentricity measurement is not provided for the entire length of the tube.

Therefore, the need is felt to achieve an innovative method for classifying metal tubes on the basis of the eccentricity thereof, which resolves the aforesaid drawbacks.

SUMMARY OF THE INVENTION

Therefore, it is an object of the present invention to provide a method for classifying or certifying tubes, also of great length, based on measuring the eccentricity along the entire length of the tube, so as to select the tubes automatically and send them to the different applications on the basis of the eccentricity tolerance required.

It is a further object of the present invention to provide a method for classifying tubes in which the eccentricity is measured in-line, along the entire length of the tube, in an affordable and non-destructive manner.

Such objects and others which will become apparent in the following description are achieved by means of a method for classifying a metal tube having a length Ltot, in which, according to claim 1, there are provided a detection system for detecting the eccentricity of a tube, adapted to measure the eccentricity of the tube along its entire length Ltot, a relative movement being provided between the tube and the detection system, and a processor adapted to process the data obtained from said detection system, in said method being defined:

a first eccentricity threshold S1, a first reference length L1 correlated to said first eccentricity threshold S1, the method comprising the steps of:

a) measuring the eccentricity of the tube along the entire total length Ltot, by means of the detection system, during said relative movement, b) executing a first sum of lengths of tube portions having eccentricity either higher than or equal to the first eccentricity threshold S1 by means of the processor, c) assigning a first class to the tube if the value of said first sum is lower than said first reference length L1, otherwise assigning a second class to the tube.

Advantageously, the eccentricity is measured by means of an in-line system for detecting the thickness of the tube, i.e. a system for detecting the eccentricity of the tube. An example of an eccentricity detection system comprises at least one detection head provided with ultrasound transducers. Such a system can for example perform 5000-15000 scans per second, which is equivalent to approximately 2-6 acquisitions per millimeter of tube.

Preferably, the measurement is taken with the tube moving with respect to the eccentricity detection system, and there is provided a tube movement system to advance the tube with respect to the eccentricity detection system. Such a movement system can, for example, be comprised in a tube drawing machine. Alternatively, the measurement can be taken with the tube in fixed position and suitably arranging the eccentricity detection system close to the tube, said detection system being provided with at least one sensor capable of moving with respect to the tube.

According to an aspect of the method of the invention, at least one threshold value, or threshold, is defined, for the eccentricity of the tube which is expressed preferably in percentage of eccentricity (e %), and at least two lasses are defined, only one of which will be assigned to the tube being examined. Furthermore, at least one reference length is defined, correlated to the at least one threshold, which will be used to carry out the classification. Considering the overall length of the tube along the longitudinal axis thereof, there can be first longitudinal tube portions having lower eccentricity than the defined threshold value and second longitudinal tube portions which have eccentricity either higher than or equal to such a threshold value. Obviously, the first or the second portions are Prot necessarily contiguous to one another, it being possible for example, for a tube portion to have eccentricity lower than the threshold, followed by a tube portion having eccentricity higher than the threshold, followed in turn by a tube portion having eccentricity lower than the threshold. The automated measurement provides the length of each tube portion having eccentricity higher than/equal to or lower than the threshold value. Alternatively, the length of each tube portion having eccentricity either higher than or equal to/lower than the threshold value, can be provided.

The data of the measurement taken with the detection system are sent to a processor which implements a software, that is a data processing system, capable of calculating the sum of the length of the tube portions which have eccentricity either lower or higher than the threshold, respectively. The processor is then capable of comparing such sums with the at least defined reference length. Considering the sun of the lengths of the first tube portions, the sum of the lengths of the second tube portions and the at least one reference length, at least two conditions can be defined, at least one of which is verified. A class to be assigned to the tube corresponds to each condition. For example, the conditions for the assignment of the classes can be:

Class 1, if the sum of the lengths of the tube portions which have eccentricity either higher than or equal to the threshold is lower than the reference length, or Class 2, if the preceding condition does not exist, that is if the sum of the lengths of tube portions which have eccentricity either higher than or equal to the threshold is either higher than or equal to the reference length.

The processor is capable of recognizing which condition exists.

The number of classes, the number and the value of the eccentricity thresholds, the number and the value of the reference lengths to be compared with the sums of the lengths of the tube portions which have eccentricity either higher or lower than a given threshold, can be selected in different manner, without departing from the scope of the present invention.

In particular the reference lengths, each reference length being associated to a respective eccentricity threshold, can be selected according to quality requirements defined by the tube manufacturers.

For example, three classes, two threshold values and two reference lengths can be defined; or four classes, three threshold values and three reference lengths; or five classes, four threshold values and four reference lengths, and so on.

According to the conditions selected for assigning the classes, several conditions can exist at the same time. In this case, a criterion for assigning the class is defined, for example it can be selected to assign the highest class possible, which according to a possible convention is the class which is assigned to tubes of the worst quality.

The reference lengths can be for example selected between 5% and 50% of the overall length of the tube, preferably between 10% and 40%. For example, a reference length can be selected between 30-40%, 20-30%, 15-20% or 10-15%.

The eccentricity threshold values can preferably be selected between 0.5 and 15%. For example, four threshold values can be equal to 2, 4, 6 and 8%.

Preferably, the method of the invention is used for metal tubes, for example made of copper or of steel, having an overall length greater than 35 meters, preferably ranging between 35 and 120 meters, for example approximately 60, 80 or 100 meters.

Preferably, a label, even more preferably a colored label, is associated with each class. Once the tube is classified according to the method of the invention, a labeling machine can be provided which automatically applies the label of the color corresponding to the class assigned to the tube. Alternatively, there can be provided an automatic device which, once the tube is classified according to the method of the invention, is capable of spraying, still in-line, a colored paint stripe on the tube, using a different color on the basis of the class assigned to the tube.

Advantageously, due to the method of the invention, there is provided a classification or certification of the tubes which allows the tubes to be divided on the basis of the type of application or of further processing which will be executed thereon.

For example, tubes classified with a lower quality can be designated to the production of a final product with great thickness, thus reducing the intermediate breakages during the thickness reductions which occur in drum drawing machines, or spinner blocks.

Tubes classified with a higher quality can be, for example, designated to the production of a final product with low thickness, thus reducing the intermediate breakages during the thickness reductions which occur in drum drawing machines.

Advantageously, the processor is capable of providing real-time data concerning the tube being measured, and providing a daily summary comprising the number of tubes measured, and for each tube it can provide information on date, time, progressive tube number, meters of tube which have eccentricity either higher or lower than one or more thresholds, maximum eccentricity of the tube. There can also be displayed the extension of the tube which belongs to the range between the thresholds and the complete graph representative of the measurement.

Preferably, since the measurement is taken in-line on a tube which advances with respect to the detection system, the axis of abscissas on the graphs created by the processor depicts a time t, for example an hour. By knowing the speed of advancement of the tube with respect to the measurement sensors, it is possible to correlate the length of tube measured at the time indicated. Even more preferably, but not necessarily, the detection system measures both the eccentricity and the length of the tube as a function of time. Such an object can be achieved for example, by means of an encoder, or coder, which detects the length of the tube as a function of time. Then a graph is provided on which two curves are depicted, a first curve depicting the measurement, or trend, over time of the eccentricity of the tube, and the second curve depicting the measurement over time of the length of the tube. Obviously, the second curve has a linearly increasing trend over time. The time, common to the two curves, is depicted on the axis of abscissas, and two scales are depicted on the axis of ordinates. The first scale refers to the first curve, and therefore to the eccentricity of the tube, and the second scale refers to the second curve, and therefore to the length of the tube. From the comparison, or from the overlapping the two curves the processor associates eccentricity values with longitudinal tube portions. The encoder can be comprised in the processor or can be a separate unit.

It is worth noting that the eccentricity can also be measured on a reasonable number of longitudinal tube portions, without departing from the scope of the present invention.

The dependent claims describe the embodiments of the invention.

BRIEF DESCRIPTION OF THE DRAWINGS

Further features and advantages of the invention will become more apparent in light of the detailed description of preferred, but not exclusive, embodiments of a method for classifying tubes, disclosed by way of a non-limiting example, with the aid of the accompanying drawings, in which.

The same numbers and the same reference letters in the figures identify the same elements or components.

DETAILED DESCRIPTION OF PREFERRED EMBODIMENTS OF THE INVENTION

In order to achieve the method for classifying tubes of the present invention, there are provided:
a detection system for detecting the eccentricity of the tube, adapted to measure the eccentricity of the tube along its entire length Ltot, a relative movement being provided between the tube and the detection system,
and a processor adapted to process data obtained from the detection system.

The detection system is capable of detecting both the eccentricity and the length of the tube as a function of time, that means capable of detecting both the eccentricity and the length of the tube during said relative movement.

A first embodiment of the method for classifying metal tubes provides the definition of a first eccentricity threshold S1 and of a first reference length L1 correlated to said first threshold S1, and comprises the steps of:
a) measuring the eccentricity of the tube along the entire overall length Ltot, by means of the detection system, during the relative movement between tube and detection system,
b) executing a first sum of lengths of tube portions having eccentricity either higher than or equal to the first threshold S1 by means of the processor,
c) assigning a first class (Class 1) to the tube if the value of said first sum is lower than the first reference length L1, otherwise assigning a second class (Class 2) to the tube.

A second embodiment of the method for classifying metal tubes provides the definition of
a first eccentricity threshold S1,
a second eccentricity threshold S2, higher than the first threshold S1,
a first reference length L1 correlated to said first threshold S1, and
a second reference length L2 correlated to said second threshold S2, and comprises the steps of:
a) measuring the eccentricity of the tube along the entire overall length Ltot, by means of the detection system, during the relative movement between tube and detection system,
b) executing, by means of the processor, a first sum of lengths of tube portions having eccentricity either higher than or equal to the first threshold S1 and a second sum of lengths of tube portions having eccentricity either higher than or equal to the second threshold S2,
c) assigning a third class (Class 3) to the tube if the value of the second sum is either higher than or equal to said second reference length L2, otherwise assigning the second class (Class 2) to the tube if the value of the first sum is either higher than or equal to the first reference length L1, otherwise assigning the first class (Class 1) to the tube.

A third embodiment of the method for classifying metal tubes provides the definition of
a first eccentricity threshold S1,
a second eccentricity threshold S2, higher than the first threshold S1,
a third eccentricity threshold S3, higher than the second threshold S2,
a first reference length L1 correlated to said first threshold S1,
a second reference length L2 correlated to said second threshold S2,
a third reference length L3 correlated to said third threshold S3, and comprises the steps of:
a) measuring the eccentricity of the tube along the entire overall length Ltot, by means of the detection system, during the relative movement between tube and detection system,
b) executing, by means of the processor, a first sum of lengths of tube portions having eccentricity either higher than or equal to the first threshold S1, a second sum of lengths of tube portions having eccentricity either higher than or equal to the second threshold S2, and a third sum of lengths of tube portions having eccentricity higher than the third threshold S3,
c) assigning a fourth class (Class 4) to the tube if the value of the third suns is either higher than or equal to the third reference length L3, otherwise assigning a third class (Class 3) to the tube if the value of the second sum is either higher than or equal to the second reference length L2, otherwise assigning the second class (Class 2) to the tube if the value of the first suns is either higher than or equal to the first reference length L1, otherwise assigning the first class (Class 1) to the tube.

A fourth embodiment of the method for classifying metal tubes provides the definition of
a first eccentricity threshold S1,
a second eccentricity threshold S2, higher than the first threshold S1,
third eccentricity threshold S3, higher than the second threshold S2,
a fourth eccentricity threshold S4, higher than the third threshold S3,
a first reference length L1 correlated to said first threshold S1,
a second reference length L2 correlated to said second threshold S2,
a third reference length L3 correlated to said third threshold S3, and
a fourth reference length L4 correlated to said fourth threshold S4, and comprises the steps of:
a) measuring the eccentricity of the tube along the entire overall length Ltot, by means of the detection system during the relative movement between tube and detection system,
b) executing, by means of the processor, a first sum of lengths of tube portions having eccentricity either higher than or equal to the first threshold S1, a second sum of lengths of tube portions having eccentricity either high than or equal to the second threshold S2, a third sum of lengths of tube portions having eccentricity higher than the third threshold S3, and a fourth sum of lengths of tube portions having eccentricity higher that the fourth threshold S4, c) assigning a fifth class (Class 5) to the tube if the value of the fourth sum is either higher than or equal to the fourth reference length L4, otherwise assigning a fourth class (Class 4) to the tube if the value of the third sum is either higher than or equal to the third reference length L3, otherwise assigning a third class (Class 3) to the tube if the value of the second sum is either higher than or equal to the second reference length L2, otherwise assigning the second class (Class 2) to the tube if the value of the first sum is either higher than or equal to the fast reference length L1, otherwise assigning the first class (Class 1) to the tube.

In the following examples, the method of the invention provides dividing the tubes into five classes. Only one of the five classes is assigned to each tube. Starting from the first class, Class 1, which is assigned to tubes of the best quality in terms of eccentricity, the quality of the tube increasingly decreases, until arriving at the last class, Class 5, assigned to tubes of the worst quality.

For the purposes of assigning the classes, there are defined four threshold values, or eccentricity thresholds, expressed in percentage value (e %). In particular, the first threshold S1 can be selected equal to 2%; the second threshold S2 can be selected equal to 4%; the third threshold S3 can be selected equal to 6%, the fourth threshold S4, or last threshold, can be selected equal to 8%.

On the basis of the eccentricity measured in-line, one or more tube portions can have an eccentricity lower than the first threshold or ranging between two close thresholds, or higher than the last threshold. In other terms, one or more tube portions have an eccentricity which can be either higher than or equal to one or more of one of the four thresholds.

For the purposes of assigning the class, it is also calculated the sum of the lengths of tube portions which have eccentricity either higher than or equal to the first threshold S1, the sum of the lengths of tube portions which have eccentricity either higher than or equal to the second threshold S2, the sum of the lengths of tube portions which have eccentricity either higher than or equal to the third threshold S3, and the sum of the lengths of tube portions which have eccentricity either higher than or equal to the fourth threshold S4.

It is apparent that the sum of the lengths of tube portions which have eccentricity either higher than or equal to threshold S1 comprises also the sum of the lengths of tube portions which have eccentricity either higher than or equal to threshold S2, to threshold S3 and to threshold S4, respectively. In the same way, the sum of the lengths of tube portions which have eccentricity either higher than or equal to threshold S2 comprises also the sum of the lengths of tube portions which have eccentricity either higher than or equal to threshold S3 and to threshold S4, respectively. And again, the sum of the lengths of tube portions which base eccentricity either higher than or equal to threshold S3 comprises also the sum of the lengths of tube portions which have eccentricity either higher than or equal to threshold S4.

Each sum is compared with predetermined reference length values, or reference lengths indicated by L1, L2, L3 and L4, and associated with the eccentricity threshold S1, S2, S3 and S4, respectively, thus defining conditions for assigning classes.

If several conditions are met at the same time, according to a predefined criterion, the class associated with the tube is the highest class met, i.e. the class that identifies a tube of worst quality according to the convention used.

The conditions for assigning classes are the following:

The tube is in Class 1 if the sum of the lengths of tube portions which have eccentricity either higher than or equal to threshold S1 is lower than a first reference length L1, for example equal to 30 m.

The tube is in Class 2 if the sum of the lengths of tube portions which have eccentricity either higher than or equal to threshold S1 is either higher than or equal to the first reference length L1.

The tube is in Class 3 if the sum of the lengths of tube portions which have eccentricity either higher than or equal to threshold S2 is either higher than or equal to a second reference length L2, for example equal to 20 m.

The tube is in Class 4 if the sum of the lengths of tube portions which have eccentricity either higher than or equal to threshold S3 is either higher than or equal to a third reference length L3, for example equal to 15 m.

The tube is in Class 5 if the sum of the lengths of tube portions which have eccentricity either higher than or equal to threshold S4 is either higher than or equal to a fourth reference length L4, for example equal to 10 m.

Figure 1:
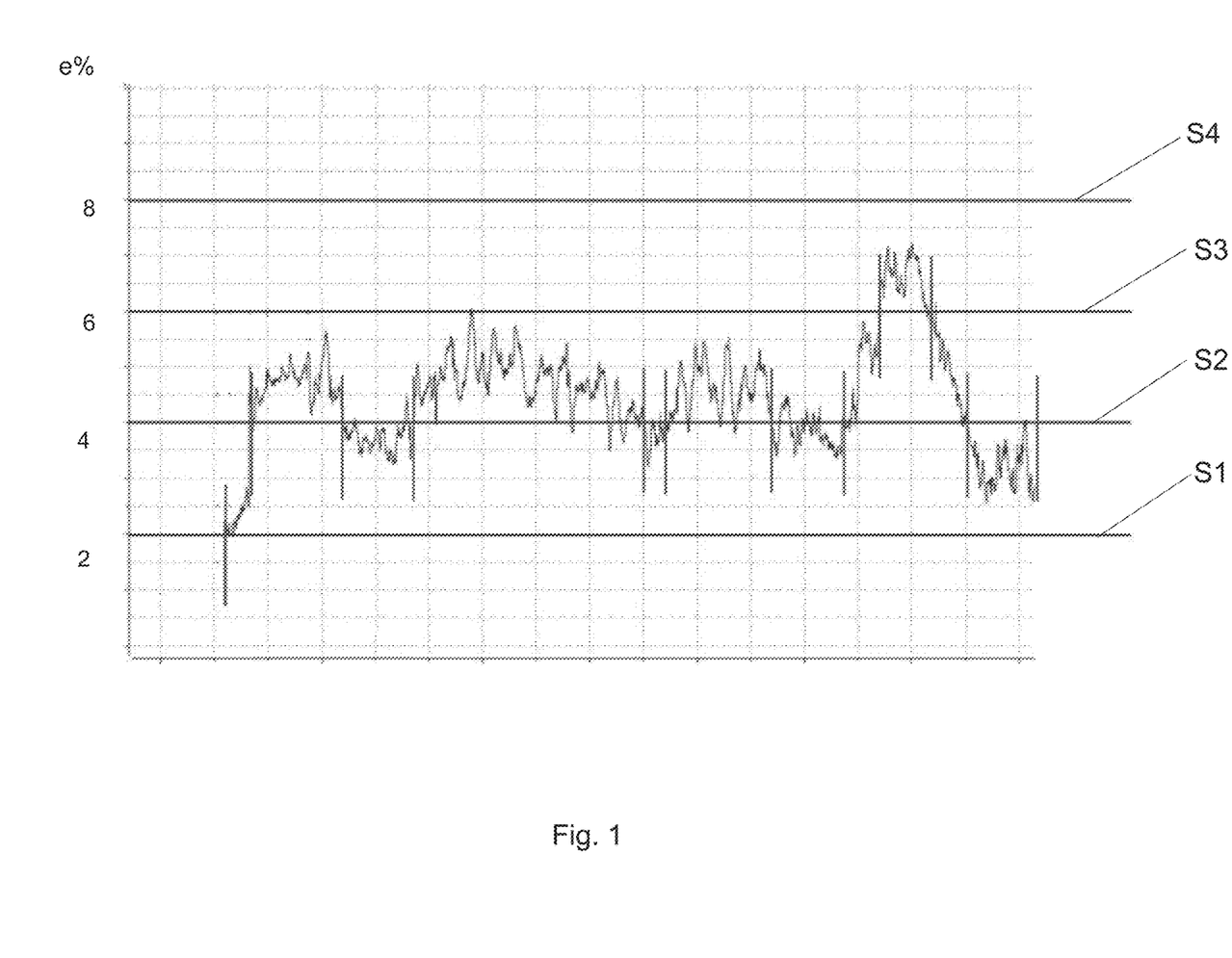
FIG. 1 shows the graph of a first in-line eccentricity measurement of a first tube.
Figure 2:
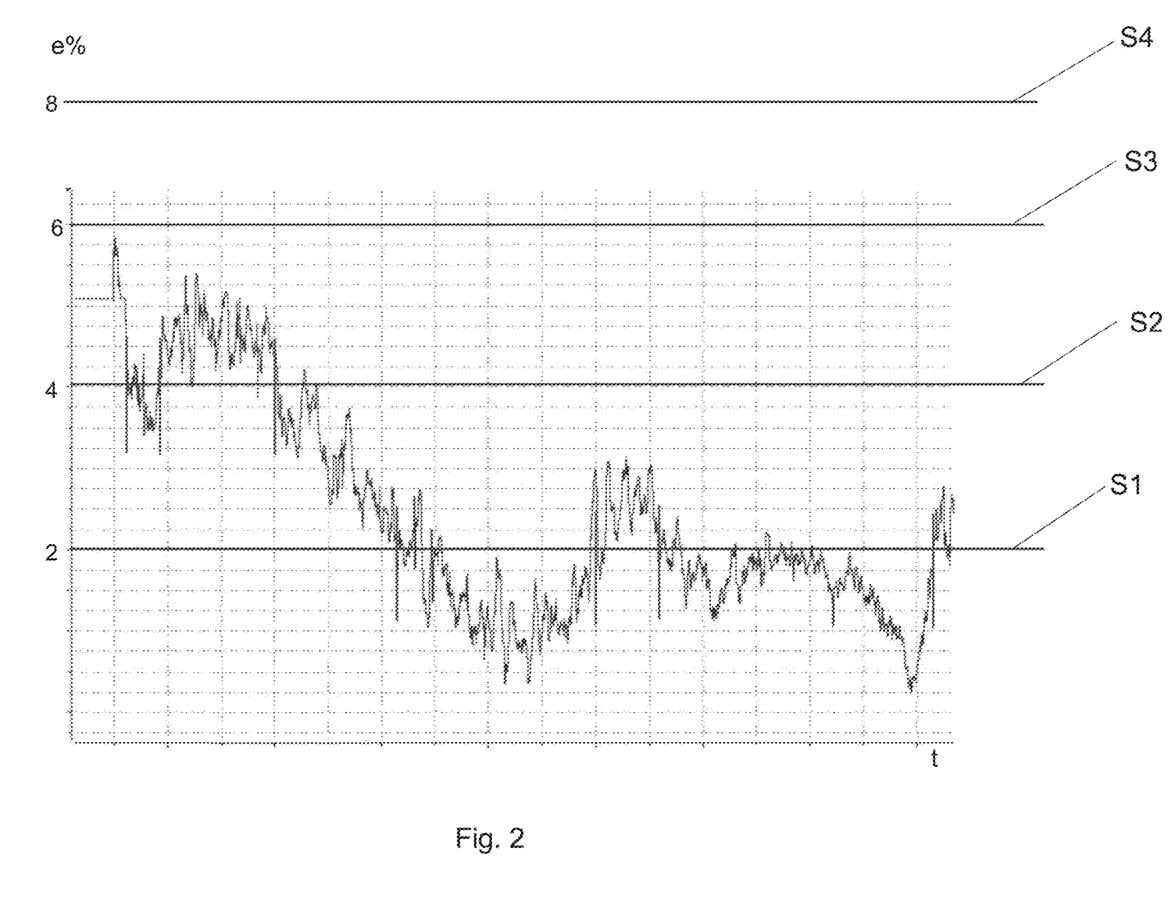
FIG. 2 shows the graph of a second inline eccentricity measurement of a second tube.
Figure 3:
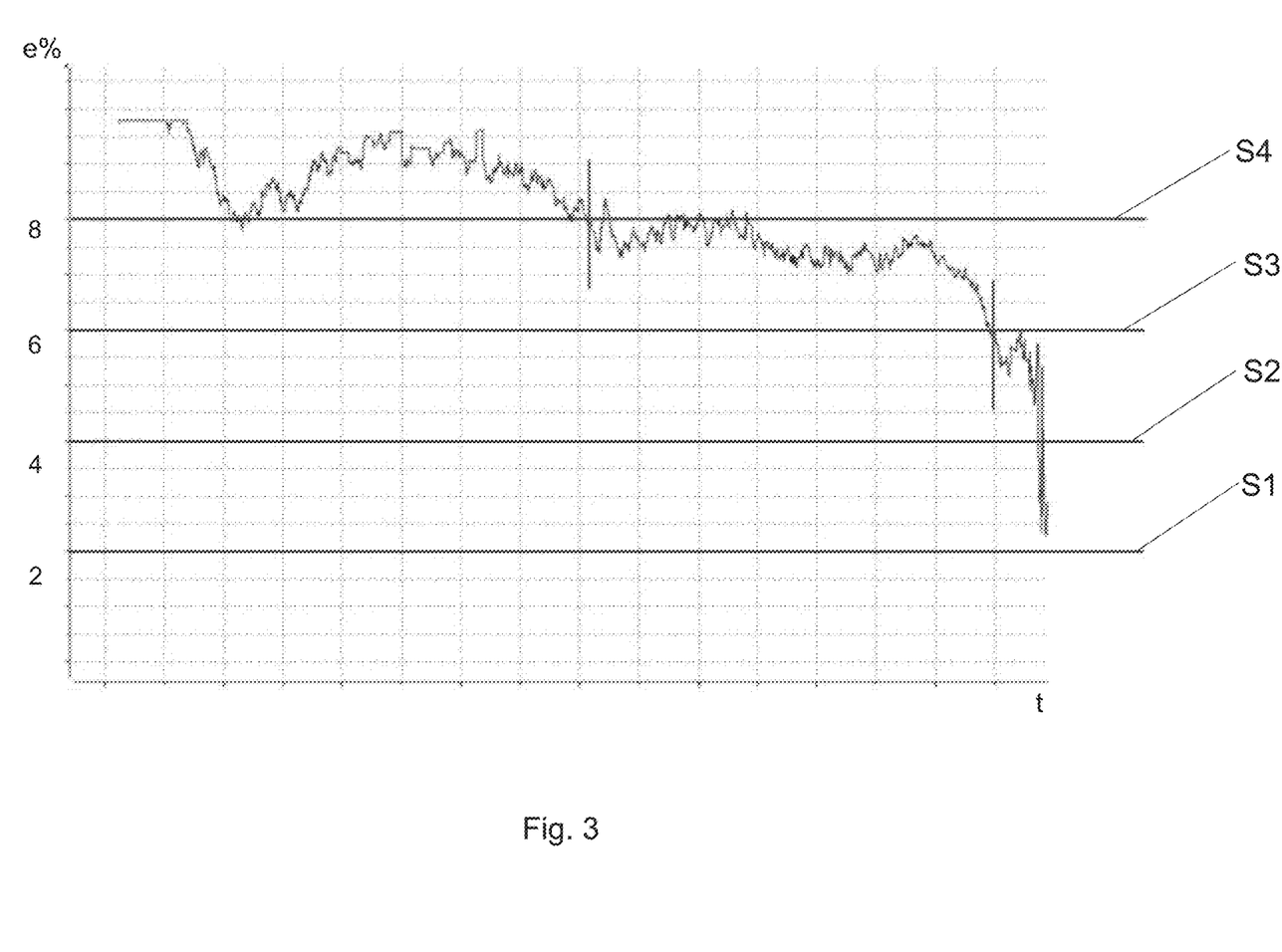
FIG. 3 shows the graph of a third in-line eccentricity measurement of a third tube.

FIGS. 1, 2, 3 illustrate, respectively, the graphs obtained from the eccentricity measurements of three different tubes. The measurement was taken along the entire length of each tube, which is equal to 86 m. The eccentricity of the tubes of each example is different, as is further described, below.

The axis of abscissas in the graphs illustrated in FIGS. 1, 2, 3 depicts a time t.

The axis of ordinates depicts the eccentricity values. The selected eccentricity thresholds S1, S2, S3 and S4 are indicated with a solid line.

Alternatively, the axis of abscissas can depict a length.

Example 1

From the eccentricity measured on a first tube having a length of 86 m, and from the graph depicting it (FIG. 1), the following emerges:

the sum of the lengths of tube portions which have eccentricity between threshold S1 and threshold S2 is equal to 27 m, the sum of the lengths of tube portions which have eccentricity between threshold S2 and threshold S3 is equal to 54 m, the sum of the lengths of tube portions which have eccentricity between threshold S3 and threshold S4 is equal to 5 m, and, considering the conditions for assigning classes described above, the following emerges:

the sum of the lengths of tube portions which have eccentricity either higher than or equal to threshold S1 is equal to 86 m, that is equal to the entire length of the tube (given by the sum of 27 m+54 m+5 m), the sum of the lengths of tube portions which have eccentricity either higher than or equal to threshold S2 is equal to 59 m (given by the sum of 54 m+5 m), the sum of the lengths of tube portions which have eccentricity either higher than or equal to threshold S3 is equal to 5 m.

Therefore, two of the conditions for assigning classes defined above are met, i.e. the eccentricity of the tube is higher than threshold S1 for a length (86 m) higher than L1=30 m, which is the condition for assigning Class 2, and the eccentricity of the tube is higher than threshold S2 for a length (59 m) higher than L2=20 m, which is the condition for assigning Class 3. According to the predefined criterion defined above, the highest class possible is assigned, and in this case Class 3 is assigned to the tube.

Example 2

From the eccentricity measured on a second tube having a length of 86 m, and from the graph depicting it (FIG. 2), the following emerges:

the sum of the lengths of tube portions which have eccentricity lower than threshold S1, is equal to 51 m, the sum of the lengths of tube portions which have eccentricity between threshold S1 and threshold S2 is equal to 23 m, the sum of the lengths of tube portions which have eccentricity between threshold S2 and threshold S3 is equal to 12 m, and, considering the conditions for assigning classes described above, the following emerges:

the sum of the lengths of tube portions which have eccentricity either higher than or equal to threshold S1 is equal to 35 m (given by the sum of 23 m+12 m), the sum of the lengths of tube portions which have eccentricity either higher than or equal to threshold S2 is equal to 12 m.

Therefore, one of the conditions for assigning classes defined above is met, i.e. the eccentricity of the tube is higher than threshold S1 for a length (35 m) higher than L1=30 m.

This is the condition for assigning Class 2, which is the class assigned to the tube.

Example 3

From the eccentricity measured on a third tube having a length of 86 m, and from the graph depicting it (FIG. 3), the following emerges:

the sum of the lengths of tube portions which have eccentricity between threshold S2 and threshold S3 is equal to 5 m, the sum of the lengths of tube portions which have eccentricity between threshold S3 and threshold S4 is equal to 37.5 m, the sum of the lengths of tube portions which have eccentricity higher than threshold S4, is equal to 43.5 m, and, considering the conditions for assigning classes described above, the following emerges:

the sum of the lengths of tube portions which have eccentricity either higher than or equal to threshold S1 is equal to 86 m, that is equal to the entire length of the tube (given by the sum of 5 m+37.5 m+43.5 m), the sum of the lengths of tube portions which have eccentricity either higher than or equal to threshold S2 is also equal to 86 m, that is equal to the entire length of the tube (given by the sum of 5 m+37.5 m+43.5 m), the sum of the lengths of tube portions which have eccentricity either higher than or equal to threshold S3 is equal to 81 m (given by the sum of 37.5 m+43.5 m), the sum of the lengths of tube portions which have eccentricity either higher than or equal to threshold S4 is equal to 43.5 m.

Therefore, four of the conditions for assigning classes defined above are met, i.e.:

the eccentricity of the tube is either higher than or equal to threshold S1 the length (86 m) higher than L1=30 m, which is the condition for assigning Class 2, the eccentricity of the tube is either higher than or equal to threshold S2 for a length (86 m) higher than L2=20 m, which is the condition for assigning Class 3, the eccentricity of the tube is either higher than or equal to threshold S3 for a length (81 m) higher than L3=15 m, which is the condition for assigning Class 4, and the eccentricity of the tube is either higher than or equal to threshold S4 for a length (43.5 m) higher than L4=10 m, which is the condition for assigning Class 5, According to the predefined criterion defined above, the highest class possible is assigned, and in this case Class 5 is assigned to the tube.

Figure 4:
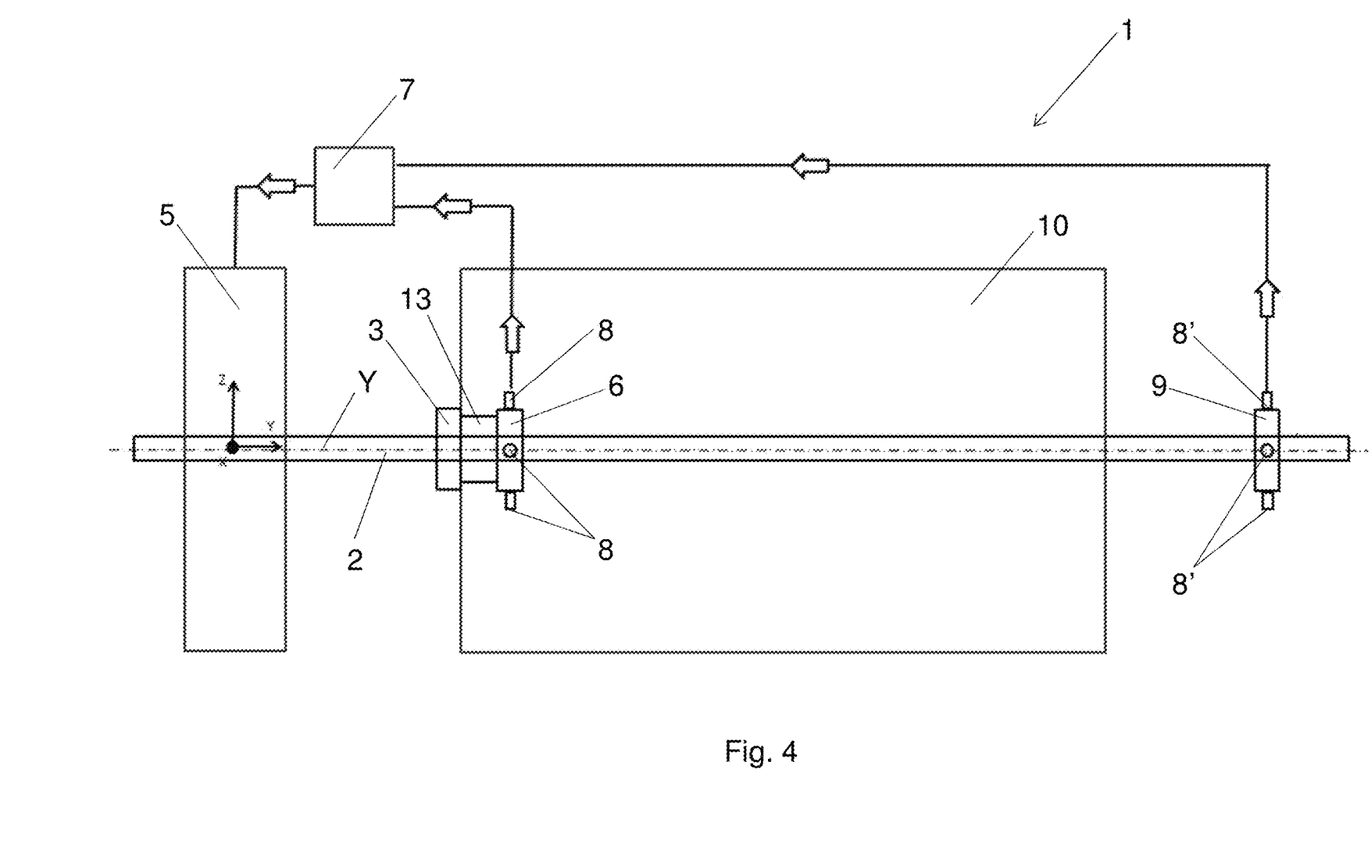
FIG. 4 shows a diagrammatic view of a drawing machine for tubes on which the method of the invention can be applied.

The method of the invention can for example be used in association with a drawing machine for tubes of the type shown in FIG. 4. Such a drawing machine 1, defining a longitudinal axis Y, comprises:

a first die 3, or working die, flit executing the drawing of a tube 2 by the use of a mandrel;

a device 5 the varying the inclination of the tube entering into said first die 3;

a second die 6, or skin pass die, for executing a skin pass operation on the tube, arranged downstream of said first die 3;

an in-line detecting system for detecting the eccentricity of the tube;

a data processing system 7 for processing signals coming from said detection system and sending input data to said device 5 for varying the inclination of the tube so as to correct the eccentricity of the tube in-line.

In a first variant of the drawing machine, the in-line system for detecting the eccentricity of the tube comprises a first detection head provided with at least transducers 8, preferably four transducers, arranged in the die holder of the second die 6. Providing these transducers in structure of the skin pass die, and not in the structure of the working die, allows increased duration of the useful life of the transducers. Indeed, the second die 6 performs only one pass on the outer surface of the tube (skin pass) to ensure contact with the tube itself, the thickness of which needs to be measured. Therefore, the second die 6 will undergo beating Which, although is high, is significantly lower than that undergone by the first die 3.

The in-line eccentricity detection system also comprises a second detection head 9, arranged downstream of said second die 6 and provided with at least three transducers 8', preferably but not necessarily four in number. This second detection head allows the eccentricity obtained to be measured and checked, thus ensuring the system is correcting and not creating further eccentricity.

Advantageously, this second detection head 9 is configured to certify the tubes according to the method of the invention, by assigning to each of them a profile of the variation of the eccentricity thereof along the entire length thereof. Such a certification allows the manufacturer direct the tube to one type of production rather than to another.

Said second detection had 9 provided preferably downstream of a caterpillar 10, or a traction device, on which both the first die 3 and the second die 6 are arranged.

The transducers 8, 8' are preferably of the ultrasound type and are arranged equally angularly spaced apart from one another. Other types of transducers can in any case be used.

The number of transducers in each detection head can also be greater than four, for example equal to six or eight. The greater the number of transducers, the more accurate the eccentricity measurement, therefore the sensitivity of the device 5 for varying the inclination of the tube is to be designed so as to maximize the accuracy of the eccentricity measurement.

A chamber 13 is provided, coaxial to the longitudinal axis Y, between the first die 3 and the second die 6.

Alternatively, in a second variant of the drawing machine, the aforesaid first detection head can be provided in the chamber 13, arranged between the die holder of the first die 3 and the die holder of the second die 6, and comprises at least three transducers, preferably of the ultrasound type and equally angularly spaced apart from one another. Also in this case, the number of the transducers 8 is preferably four or greater than four. The structure of chamber 13 provides a channel 23 for the passage of a coupling means, preferably drawing oil, in contact with the ends of the transducers and with tube 2 itself. This detection head will detect the eccentricity of tube 2 immediately after the drawing in the first die 3 and before the skin pass operation in the second die 6. Taking the measurement in this chamber between working die and skin pass die allows a more precise measurement to be obtained because, at the chamber 13, the tube is stationary in transverse direction with respect to axis Y, therefore the transducers can be positioned closer to tube 2. Furthermore, the ultrasound signal must not cross different materials such as those of which the dies are made, as there is only oil between the transducer and tube 2 to be measured. Finally, the higher quantity of oil and the non-direct contact of the transducer with the hot die for the deformation machining makes such an area better the protecting the transducers from overheating.

In a third variant of the drawing machine, there are provided two first detection heads: one provided in chamber 13, arranged between the die holder of the first die 3 and the die holder of the second die 6, and comprising at least three transducers; the other provided in the die holder of the second die 6 and provided with at least three transducers 8, as described for the first variant.

Both in the second and in the third variant, the second detection head 9, which is arranged downstream of caterpillar 10, is configured to certify the tubes according to the method of the invention and, preferably, sends signals with the eccentricity measurement to the data processing system 7 for the subsequent sending of input data to the device 5 for varying the inclination of the tube so as to vary the inclination of the tube and correct the eccentricity of the tube in-line.

Preferably, the second detection head 9 is arranged at a distance of 12-16 meters from the working die 3.

The invention claimed is:

1. A method for classifying a metal tube having a total length, comprising:
   providing a detection system for detecting an eccentricity of a tube, including a first detection head and a second detection head, both the first detection head and the second detection head including at least three transducers, the first detection head being placed on an opposite side of a traction device from the second detection head, a relative movement being provided between the tube and the detection system;
   providing a processor adapted to process data obtained from said detection system, the data including
   a first eccentricity threshold;
   a first reference length correlated to said first eccentricity threshold;
   the method comprising the steps of:
   measuring the eccentricity of the tube along the entire total length by means of the detection system, during said relative movement;
   execrating a first sum of lengths of tube portions having eccentricity either higher than or equal to the first eccentricity threshold by means of the processor;
   assigning a first class to the tube if a value of said first sum is lower than said first reference length, otherwise assigning a second class to the tube.

2. The method according to claim 1, wherein a second eccentricity threshold, higher than the first eccentricity threshold, and a second reference length, correlated to said second eccentricity threshold, are defined,
   wherein in step b) a second sum of lengths of tube portions having eccentricity either higher than or equal to the second eccentricity threshold is also executed, and in step c) a third class is assigned to the tube if a value of said second sum is either higher than or equal to said second reference length, otherwise said second class is assigned to the tube if the value of said first sum is either higher than or equal to said first reference length, otherwise the first class is assigned to the tube.

3. The method according to claim 2, wherein a third eccentricity threshold, higher than the second eccentricity threshold, and a third reference length, correlated to said third eccentricity threshold, are defined,
   whereby in step b) a third sum of lengths of tube portions having eccentricity either higher than or equal to the third eccentricity threshold is also executed, and in step c) a fourth class is assigned to the tube if a value of said third sum is either higher than or equal to said third reference length, otherwise, said third class is assigned to the tube if the value of said second sum is either higher than or equal to said second reference length, otherwise said second class is assigned to the tube if the value of said first sum is either higher than or equal to said first reference length, otherwise the first class is assigned to the tube.

4. The method according to claim 3, wherein a fourth eccentricity threshold S4, higher than the third eccentricity threshold, and a fourth reference length, correlated to said fourth eccentricity threshold, are defined,
   whereby in step b) a fourth sum of lengths of tube portions having eccentricity either higher than or equal to the fourth eccentricity threshold is also executed, and in step c) a fifth class is assigned to the tube if a value of said fourth sum is either higher than or equal to said fourth reference length, otherwise a fourth class is assigned to the tube if the value of said third sum is either higher than or equal to said third reference length, otherwise said third class is assigned to the tube if the value of said second sum is either higher than or equal to said second reference length, otherwise said second class is assigned to the tube if the value of said first sum is either higher than or equal to said first reference length, otherwise the first class is assigned to the tube.

5. The method according, to claim 4, wherein said first eccentricity threshold is equal to 2%, said second eccentricity threshold is equal to 4%, said third eccentricity threshold is equal to 6%, and said fourth eccentricity threshold is equal to 8%.

6. The method according to claim 1, wherein the eccentricity of the tube along its entire total length is detected in a drawing machine.

7. The method according to claim 6, wherein the eccentricity is detected by the second detection head, the second detection head arranged downstream of the traction device of said drawing machine.

8. The method according to claim 7, wherein said first detection head and second detection head are provided with ultrasound transducers, equally angularly spaced apart from one another.

9. The method according to claim 1, wherein there is provided a detection of the length of the tube as a function of time by means of said detection system.

\* \* \* \* \*